(12) United States Patent
Shimazu et al.

(10) Patent No.: US 10,841,442 B2
(45) Date of Patent: Nov. 17, 2020

(54) RECORDING APPARATUS

(71) Applicant: SEIKO EPSON CORPORATION, Tokyo (JP)

(72) Inventors: Masamitsu Shimazu, Matsumoto (JP); Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/574,350

(22) Filed: Sep. 18, 2019

(65) Prior Publication Data

US 2020/0092433 A1 Mar. 19, 2020

(30) Foreign Application Priority Data

Sep. 19, 2018 (JP) .................... 2018-175103

(51) Int. Cl.
*H04N 1/00* (2006.01)
*B65H 43/00* (2006.01)
*B65H 29/58* (2006.01)

(52) U.S. Cl.
CPC ......... *H04N 1/00543* (2013.01); *B65H 29/58* (2013.01); *B65H 43/00* (2013.01);
(Continued)

(58) Field of Classification Search
CPC .......... H04N 1/00631; H04N 1/32122; H04N 2201/3216; H04N 1/00236; H04N 1/00633; H04N 1/00641; H04N 1/32635; H04N 1/32667; H04N 1/46; H04N 2201/0039; H04N 2201/0072; H04N 2201/0094; H04N 2201/3205; H04N 2201/3221; H04N 2201/3223; H04N 1/00254; H04N 1/00525; H04N 1/00832; H04N 1/1017; H04N 1/193; H04N 1/32358; H04N 2201/0081; H04N 2201/0082; H04N 2201/0086;
(Continued)

(56) References Cited

U.S. PATENT DOCUMENTS 6,085,063 A * 7/2000 Morita ............... H04N 1/00631
355/40
10,414,619 B2 * 9/2019 Tachibana .......... G03G 15/6544
(Continued)

FOREIGN PATENT DOCUMENTS

JP 2010008586 1/2010
JP 2014014940 1/2014

*Primary Examiner* — Negussie Worku
(74) *Attorney, Agent, or Firm* — Workman Nydegger

(57) ABSTRACT

A recording apparatus includes a lower unit having a recording section configured to perform recording on a medium, and an upper unit disposed on the lower unit, the upper unit including a reading section configured to read an image of the document, in which the lower unit includes a medium discharge section configured to discharge the medium toward the rear of the apparatus, and a medium receiving section disposed on the apparatus rear side with respect to the medium discharge section, the medium receiving section being configured to receive the medium discharged, and the upper unit is shorter than the lower unit in the apparatus front-rear direction and the upper unit is closer to the apparatus front with respect to the lower unit such that an end portion of the medium receiving section in the medium discharging direction is exposed at the rear of the upper unit.

9 Claims, 13 Drawing Sheets

(52) U.S. Cl.
CPC ..... *H04N 1/00557* (2013.01); *H04N 1/00612* (2013.01); *H04N 1/00618* (2013.01); *H04N 1/00631* (2013.01)

(58) Field of Classification Search
CPC ... H04N 2201/0434; H04N 2201/3274; H04N 2201/3288; B65H 2511/216; B65H 2220/02; B65H 2301/16; B65H 2701/11312; B65H 2801/12; B65H 2801/39; B65H 29/008; B65H 31/22; B65H 15/00; B65H 2301/33; B65H 2301/43821; B65H 2801/27; B65H 29/60; B65H 31/24; B65H 37/04; G03G 15/1695; G03G 15/6552; G03G 15/041; G03G 15/21; G03G 15/231; G03G 15/234; G03G 15/36; G03G 15/502; G03G 15/507; G03G 15/55; G03G 15/60; G03G 15/6508; G03G 15/6514; G03G 15/6544; G03G 15/6573; G03G 15/6579; G03G 15/6585; G03G 21/02; G03G 21/1638; G03G 21/206; G03G 2215/00282; G03G 2215/00383; G03G 2215/00392; G03G 2215/00405; G03G 2215/00421; G03G 2215/0043; G03G 2215/00548; G03G 2215/00556; G03G 2215/00578; G03G 2215/00586; G03G 2215/00594; G03G 2215/00734; G03G 2215/0177; G03G 2215/0487; G03G 2215/20; G03G 2221/1675; G03G 2221/169; G06F 3/1204; G06F 3/1264; G06F 3/1285; G06K 15/403; Y10S 271/902

USPC ........................................................ 358/498
See application file for complete search history.

(56) References Cited

U.S. PATENT DOCUMENTS

| | | | |
|---|---|---|---|
| 2006/0133865 A1* | 6/2006 | Nakamura | G03G 15/6573 399/320 |
| 2011/0317184 A1* | 12/2011 | Ono | G03G 15/1695 358/1.9 |
| 2012/0201548 A1* | 8/2012 | Nakai | G03G 15/234 399/16 |
| 2013/0342881 A1* | 12/2013 | Shimazu | H04N 1/00578 358/497 |
| 2014/0009777 A1* | 1/2014 | Shimazu | H04N 1/00525 358/1.13 |
| 2014/0021677 A1* | 1/2014 | Nunokawa | B41J 13/103 271/9.08 |
| 2014/0292879 A1* | 10/2014 | Nunokawa | B65H 1/266 347/16 |
| 2015/0201096 A1 | 7/2015 | Shimazu | |
| 2016/0182750 A1 | 6/2016 | Shimazu | |
| 2017/0203575 A1* | 7/2017 | Shimazu | B41J 2/1721 |
| 2018/0009226 A1* | 1/2018 | Shimazu | B41J 23/025 |
| 2020/0099811 A1* | 3/2020 | Shimazu | H04N 1/00602 |

* cited by examiner

RECORDING APPARATUS

The present application is based on, and claims priority from JP Application Serial Number 2018-175103, filed Sep. 19, 2018, the disclosure of which is hereby incorporated by reference herein in its entirety.

BACKGROUND

1. Technical Field

The present disclosure relates to a recording apparatus for performing recording on a medium.

2. Related Art

Multifunction peripherals having an integrated printer and scanner are known. For example, JP-A-2010-008586 discloses an example multifunction peripheral. The image reading and recording apparatus described in JP-A-2010-008586 includes an image reading device disposed on an image recording device. The image reading device extends toward the front of the image recording device. In an upper part of the image recording apparatus, a recording paper discharge section for receiving discharged recording paper is provided. The design of the image reading device with respect to the image recording device provides an open space above the recording paper discharge section without the image reading device covering over the recording paper discharge section.

In the image reading and recording apparatus described in JP-A-2010-008586, however, the image reading device extends toward the front of the apparatus with respect to the image recording device, resulting in the increased dimension in the front-rear direction as a whole.

SUMMARY

According to an aspect of the present disclosure, a recording apparatus for solving the above-mentioned problem includes a lower unit having a recording section configured to perform recording on a medium, and an upper unit disposed on the lower unit, the upper unit including a document mounting plate on which a document is to be mounted, and a reading section configured to read an image of the document mounted on the document mounting plate, in which the lower unit includes a medium discharge section that reverses the medium recorded by the recording section and discharges the medium toward the rear of the apparatus, and a medium receiving section disposed on the apparatus rear side with respect to the medium discharge section such that the medium receiving section faces a lower side of the upper unit, the medium receiving section being configured to receive the medium discharged by the medium discharge section, and the upper unit is shorter than the lower unit in the apparatus front-rear direction and the upper unit is closer to the apparatus front with respect to the lower unit such that an end portion of the sheet receiving section in the medium discharging direction is exposed at the rear of the upper unit.

DESCRIPTION OF EXEMPLARY EMBODIMENTS

Figure 1:
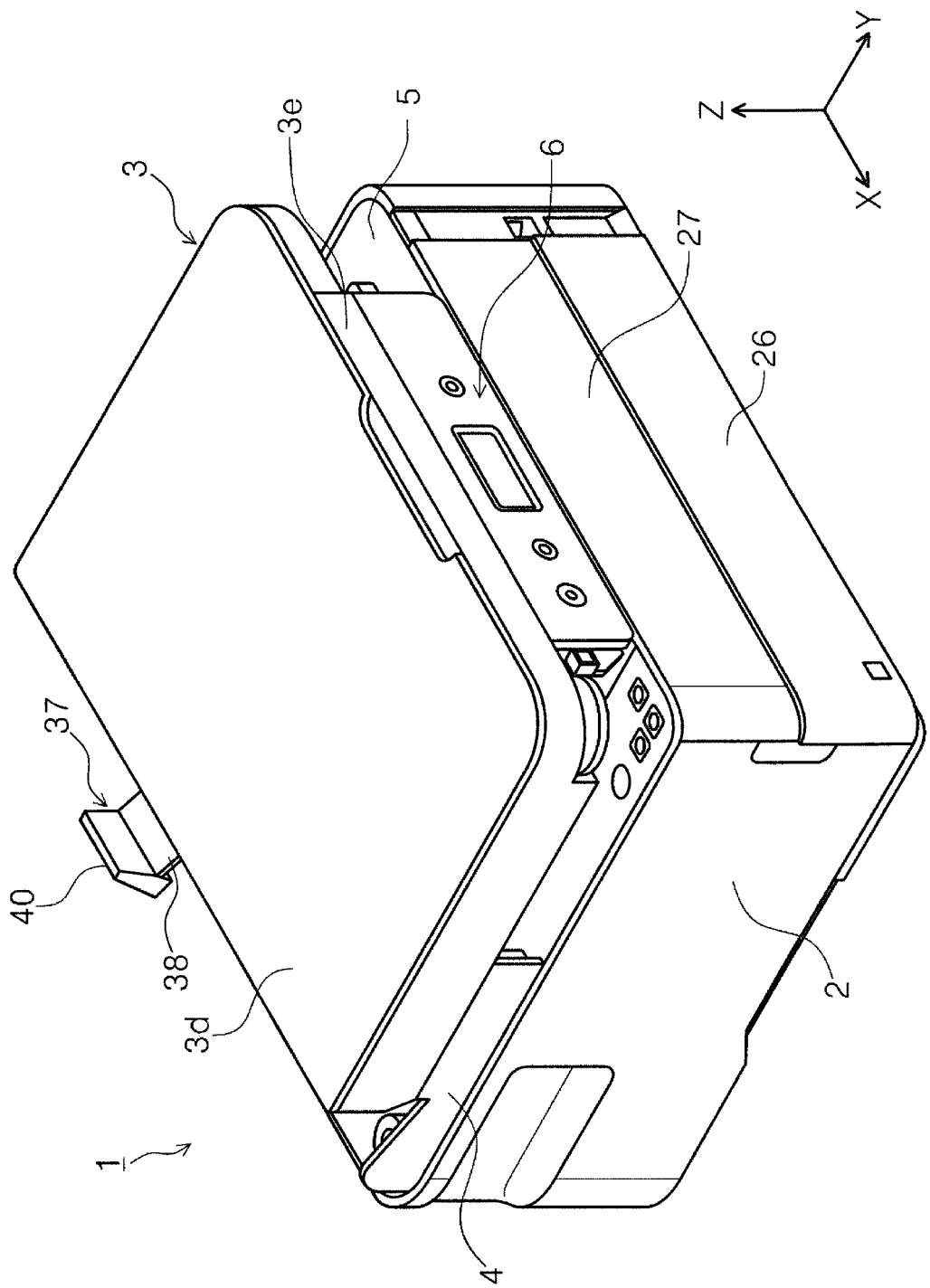
FIG. 1 is an external perspective view of a printer.

Hereinafter, an overview of the present disclosure will be described. A recording apparatus according to a first aspect includes a lower unit having a recording section configured to perform recording on a medium, and an upper unit disposed on the lower unit, the upper unit including a document mounting plate on which a document is to be mounted, and a reading section configured to read an image of the document mounted on the document mounting plate, in which the lower unit includes a medium discharge section that reverses the medium recorded by the recording section and discharges the medium toward the rear of the apparatus, and a medium receiving section disposed on the apparatus rear side with respect to the medium discharge section such that the medium receiving section faces a lower side of the upper unit, the medium receiving section being configured to receive the medium discharged by the medium discharge section, and the upper unit is shorter than the lower unit in the apparatus front-rear direction and the upper unit is closer to the apparatus front with respect to the lower unit such that an end portion of the medium receiving section in the medium discharging direction is exposed at the rear of the upper unit.

In this aspect, in a recording apparatus including a lower unit and an upper unit, the lower unit includes a medium receiving section disposed to face a lower side of the upper unit, the medium receiving section being configured to receive the discharged medium, and the upper unit is shorter than the lower unit in the apparatus front-rear direction and the upper unit is closer to the apparatus front with respect to the lower unit such that an end portion of the medium receiving section in the medium discharging direction is exposed at the rear of the upper unit. With this structure, an end portion of the medium receiving section in the medium discharging direction is exposed at the rear of the upper unit, and the upper unit does not extend out over the lower unit in the apparatus front-rear direction, and thus the reduced dimension in the apparatus front-rear direction can be achieved and the convenience in removing the discharged medium can be ensured.

The expression "the upper unit is closer to the apparatus front with respect to the lower unit" specifically means that a central position of the upper unit in the apparatus front-rear direction is closer to the apparatus front than a central position of the lower unit.

In a second aspect of the present disclosure, in the first aspect, on the apparatus front, a side of the upper unit may be flush with a side of the lower unit. According to this aspect, on the apparatus front, a side of the upper unit may be flush with a side of the lower unit, and consequently, the upper unit does not extend out over the lower unit in plan view and thus further reduced dimension in the apparatus front-rear direction can be achieved.

According to a third aspect of the present disclosure, in the first or second aspect, an operation section may be disposed, on the apparatus front, between the lower unit and the upper unit in the vertical direction, the operation section being configured to receive an operation from a user, in which a portion of the operation section and a portion of the medium receiving section overlap with each other in the vertical direction.

According to the aspect, an operation section is disposed on the apparatus front between the lower unit and the upper unit in the vertical direction, the operation section being configured to receive an operation from a user. A portion of the operation section and a portion of the medium receiving section overlap with each other in the vertical direction. With this structure, the reduced apparatus dimension in vertical direction can be achieved.

According to a fourth aspect of the present disclosure, in any one of the first to third aspects, the recording apparatus may include a stiffness applying section on a lower side of the upper unit, the stiffness applying section being configured to apply stiffness in the medium discharging direction to the medium discharged by the medium discharge section.

In this aspect, the recording apparatus includes a stiffness applying section on a lower side of the upper unit, the stiffness applying section being configured to apply stiffness in the medium discharging direction to the medium discharged by the medium discharge section. Consequently, reduced curling of the discharged medium can be achieved and the increased performance in aligning media on the medium receiving section can be achieved.

According to a fifth aspect of the present disclosure, in the fourth aspect, the stiffness applying section may be ribs that face the medium receiving section in the upper unit, extend in the medium discharging direction, and be disposed at appropriate intervals along a medium width direction intersecting the medium discharging direction, and the ribs may be configured, when viewed in the medium discharging direction, to make the medium in a convex shape or a concave shape. In this aspect, the stiffness applying section are ribs, and thus the stiffness applying section can be provided in the simple structure at low cost.

According to a sixth aspect of the present disclosure, in any one of the first to fifth aspects, the recording apparatus may include a stopper disposed downstream side of the medium discharging direction in the medium receiving section such that a leading edge of the medium discharged from the medium discharge section comes into contact with, and the stopper may be configured to be in a protruding position in which the stopper protrudes from the medium receiving section or in a retracted position in which the stopper less protrudes from the medium receiving section than in the protruding position.

In this aspect, a stopper with which a leading edge of the medium discharged from the medium discharge section comes into contact is configured to be in a protruding position in which the stopper protrudes from the medium receiving section or in a retracted position in which the stopper less protrudes from the medium receiving section than in the protruding position. With this structure, the stopper may be set in the retracted position to enable the user to remove the medium from the medium receiving section with less interference with the stopper, and thus the convenience in removing the medium can be increased.

According to a seventh aspect of the present disclosure, in any one of the first to sixth aspects, the lower unit may include a first medium discharge path configured to curve and reverse the medium recorded by the recording section with a most-recently recorded side placed face down and guide the medium toward the medium discharge section, a second medium discharge path configured to discharge the medium recorded by the recording section with a most-recently recorded side placed face up without curving and reversing the medium, a path switching member configured to switch a path between a first state in which the first medium discharge path is formed and a second state in which the second medium discharge path is formed, and a controller configured to control the apparatus, in which when the medium to be transported has a length that will be covered under the upper unit when the medium is discharged onto the medium receiving section, the controller performs a predetermined process without sending the medium to the first medium discharge path.

In this aspect, when the medium to be transported has a length that will be covered under the upper unit when the medium is discharged onto the medium receiving section, the controller performs a predetermined process without sending the medium to the first medium discharge path. Accordingly, when the medium to be transported is short and the upper unit will interfere with the user in removing the medium from the medium receiving section, the discharge of the medium to the medium receiving section may not be performed to avoid the decrease in the convenience in removing the medium.

According to an eighth aspect of the present disclosure, in the seventh aspect, the recording apparatus may include a driving section configured to drive the path switching member, in which the predetermined process may include, when the path switching member is in the first state, driving the driving section to switch the path switching member from the first state to the second state, and sending the medium to the second medium discharge path.

In this aspect, the predetermined process includes, when the path switching member is in the first state, driving the driving section to switch the path switching member from the first state to the second state and sending the medium to the second medium discharge path. Accordingly, the medium can be discharged via the appropriate path without a user operation, and thus the convenience of the user can be increased.

According to a ninth aspect of the present disclosure, in the seventh or eighth aspect, the recording apparatus may include a medium feeding path configured to curve and reverse the medium fed from a medium storage section below the recording section and guide the medium toward the recording section, in which a portion of the medium feeding path and a portion of the first medium discharge path may overlap with each other in the vertical direction.

In this aspect, in the structure having the medium feeding path and the first medium discharge path, a portion of the medium feeding path and a portion of the first medium discharge path overlap with each other in the vertical direction. Accordingly, the reduced dimension of the apparatus in the vertical direction can be achieved.

Hereinafter, embodiments of the present disclosure will be described. In the following description, an ink jet printer 1 (hereinafter, simply referred to as a "printer 1") will be described as an example recording apparatus according to the embodiment of the present disclosure. The method of performing recording to a sheet, which is an example medium, is not limited to the ink jet system, and various systems such as an electrophotographic system or a dot impact system may be employed. The ink jet system includes various systems such as a system having an ink cartridge that is attached to a carriage, a system that has an ink accommodating section provided outside a carriage and the ink accommodating section and the carriage are connected by an ink tube, and the like. Embodiments of the present disclosure may be applied to any of the systems. The printer 1 according to the embodiment has an ink accommodating section that is provided outside a carriage and the ink accommodating section and the carriage are connected by an ink tube.

In an X-Y-Z coordinate system in the drawings, an X direction denotes an apparatus width direction and a sheet width direction, a Y direction denotes a sheet transport direction in recording to a sheet and an apparatus front-rear direction (depth direction), and a Z direction denotes an apparatus height direction and a vertical direction. More specifically, a +Y direction denotes a direction from an apparatus rear toward an apparatus front, and a −Y direction denotes a direction from an apparatus front toward an apparatus rear. The apparatus front is a side of the apparatus that faces a user, or an operator, and the apparatus structure or the design of the appearance defines which side of the apparatus corresponds to the apparatus front. In one example, in an apparatus that includes various operation buttons, a display section, and an operation section designed to receive an operation from a user, generally, a side on which the operation section is provided faces the user. In the description below, a direction toward which a sheet is transported is referred to as "downstream" and the opposite direction is referred to as "upstream".

In FIG. 1, the printer 1 includes a lower unit 2 for performing recording on a sheet and an upper unit 3 that serves as a scanner, which is an example image reading apparatus. Specifically, the printer 1 is a so-called multifunction peripheral.

The upper unit 3 includes an operation section 6 near the front in the apparatus front-rear direction. The operation section 6 according to the embodiment is a tilt panel and includes a plurality of operation buttons and a display section. The operation section 6 serves as a user interface that is used to perform a recording operation or an image reading operation in the printer 1. The operation section 6 is rotatable with respect to the upper unit 3, that is, tiltable, and a torque hinge (not illustrated) allows the operation section 6 to be maintained at an inclination for providing a user high degree of ease to use.

Figure 3:
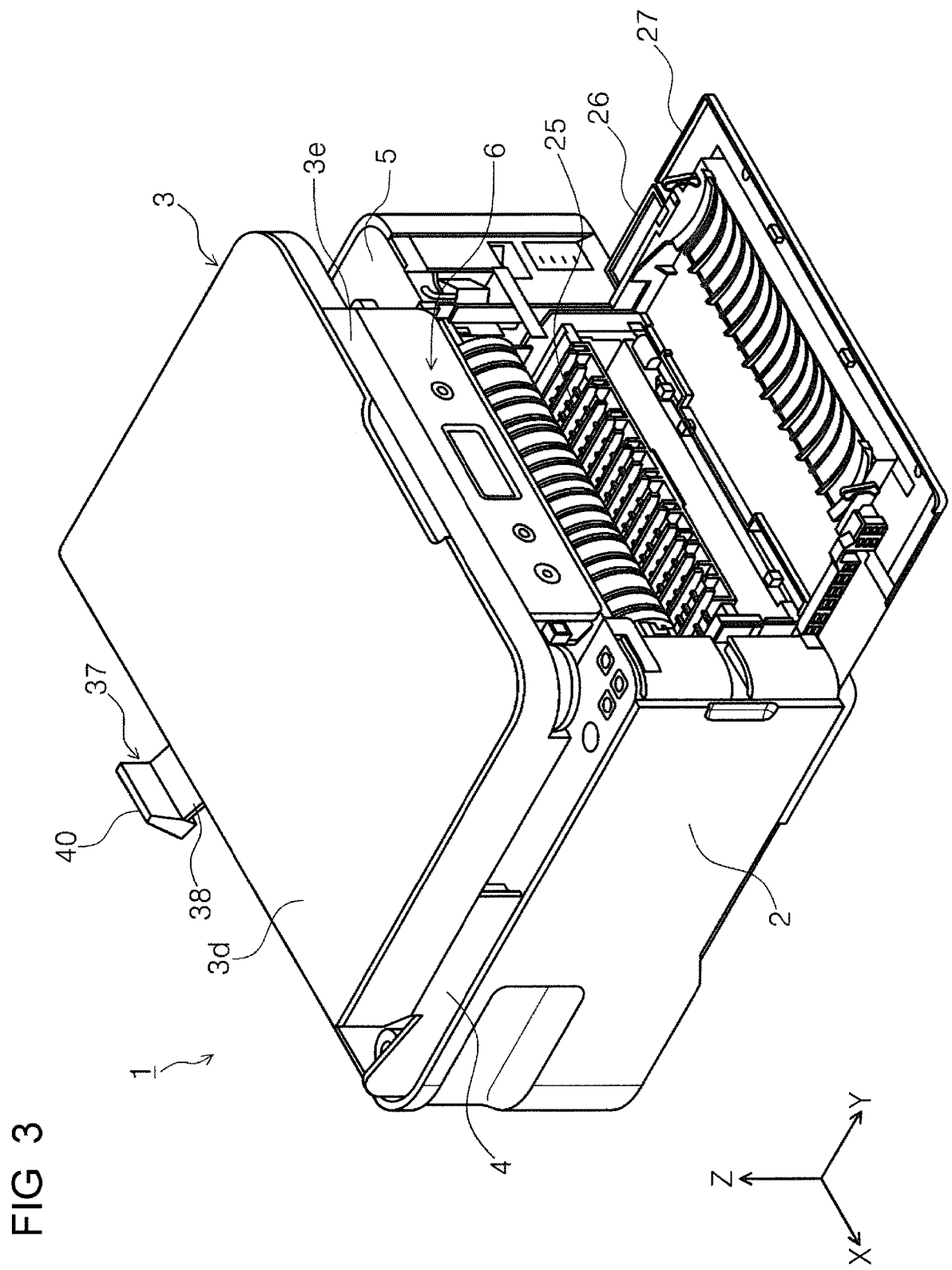
FIG. 3 is an external perspective view of a printer.

On the front of the lower unit 2, a first cover 26 and a second cover 27 are provided. The user can open the second cover 27 to clear a jam occurred in a face-down discharge path (first sheet discharge path R3, FIG. 7), which will be described below. The first cover 26 is opened and a path switching flap 25 (FIG. 7), which serves as a path switching member, is opened to perform face-up discharging, which will be described below. The first cover 26 is rotated about a rotating shaft 26a (FIG. 7) to be opened or closed. The second cover 27 is rotated together with the first cover 26 about the rotating shaft 26a (FIG. 7) to be opened or closed. FIG. 3 illustrates the first cover 26 and the second cover 27 integrally rotated and are in an open state. The first cover 26 and the second cover 27 are integrally rotated and when in the open state, function as a sheet receiving section that receives a sheet discharged via a second sheet discharge path R4 (FIG. 8) that functions as a face-up discharge path, which will be described below.

The upper unit 3 includes a cover 3d that is rotated about a rotating shaft (not illustrated) such that a platen glass 3b (FIG. 7) is opened or closed. Under the platen glass 3b, a reading section 3a (FIG. 7) that serves as a reading section for reading a document is provided. The upper unit 3 is a flatbed scanner, and the reading section 3a moves in the X direction to read a document mounted on the platen glass 3b.

Figure 4:
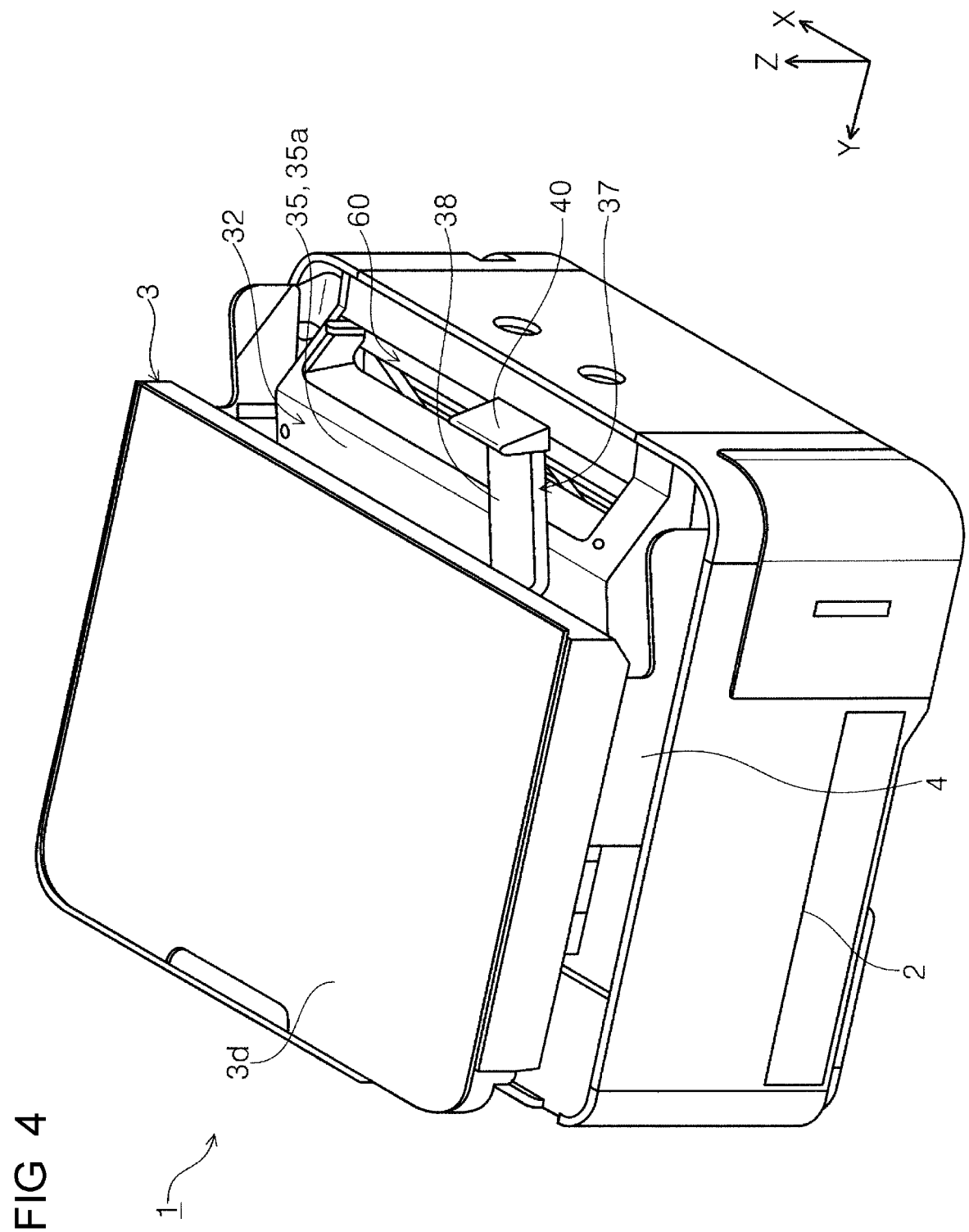
FIG. 4 is an external perspective view of a printer.

The upper unit 3 is connected with the lower unit 2 with support sections 4 that are provided on the lower unit 2. The support sections 4 are respectively provided on left and right sides of the lower unit 2 (FIG. 1, FIG. 4). The upper unit 3 is rotatably connected to the lower unit 2 with torque hinges (not illustrated) provided to the support sections 4, and the rotation allows the upper unit 3 to be in a closed position (FIG. 1) or in an open position (FIG. 2) with respect to the lower unit 2. While the upper unit 3 is open with respect to the lower unit 2, a sheet receiving section 32, which serves as a medium receiving section described below, is exposed. While the upper unit 3 is open with respect to the lower unit 2, a cover 5 may be opened or closed. The cover 5 is used to open or close an ink inlet of an ink tank (not illustrated).

Figure 7:
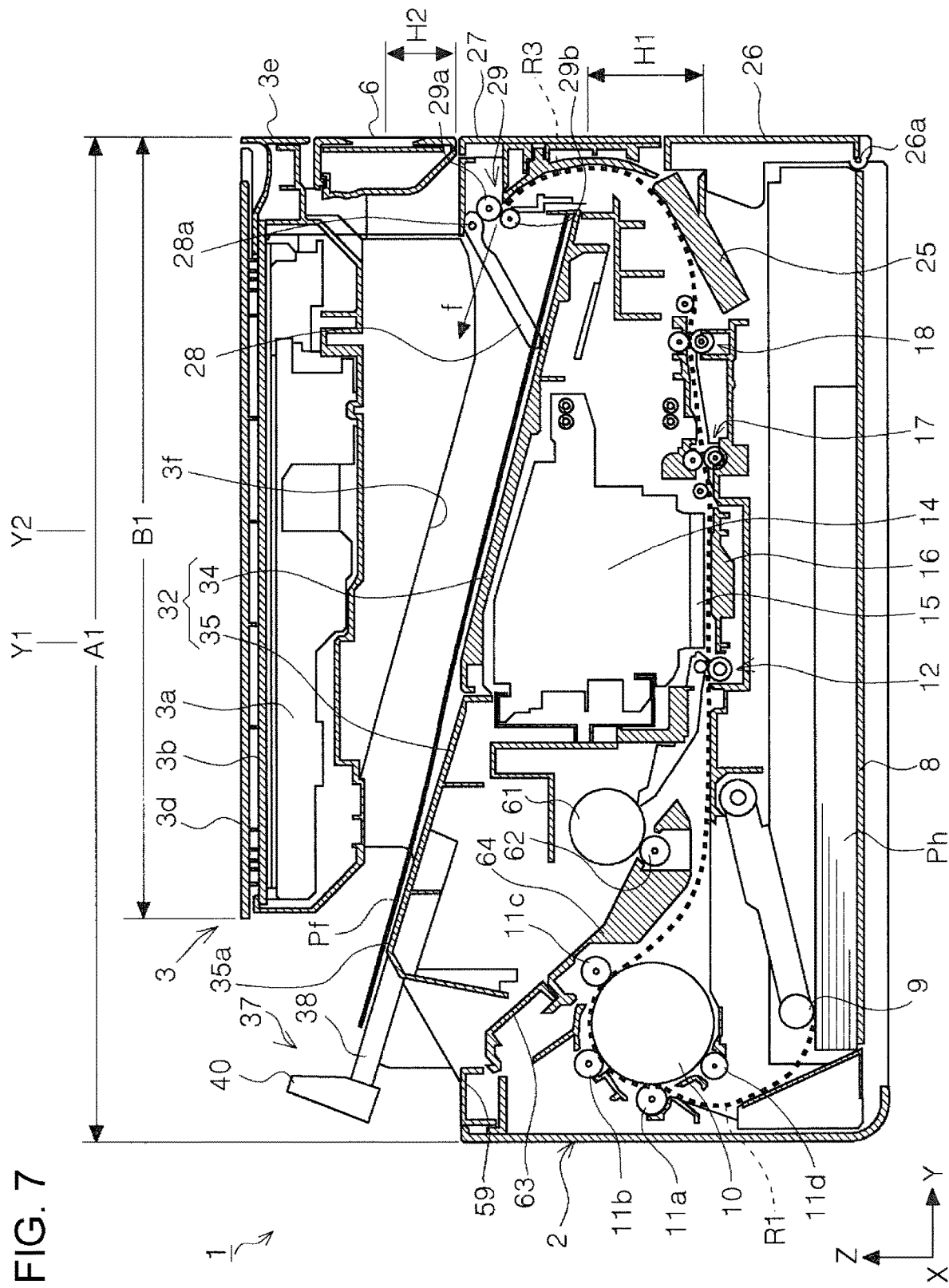
FIG. 7 is a side cross-sectional view illustrating sheet transport paths in a printer.
Figure 8:
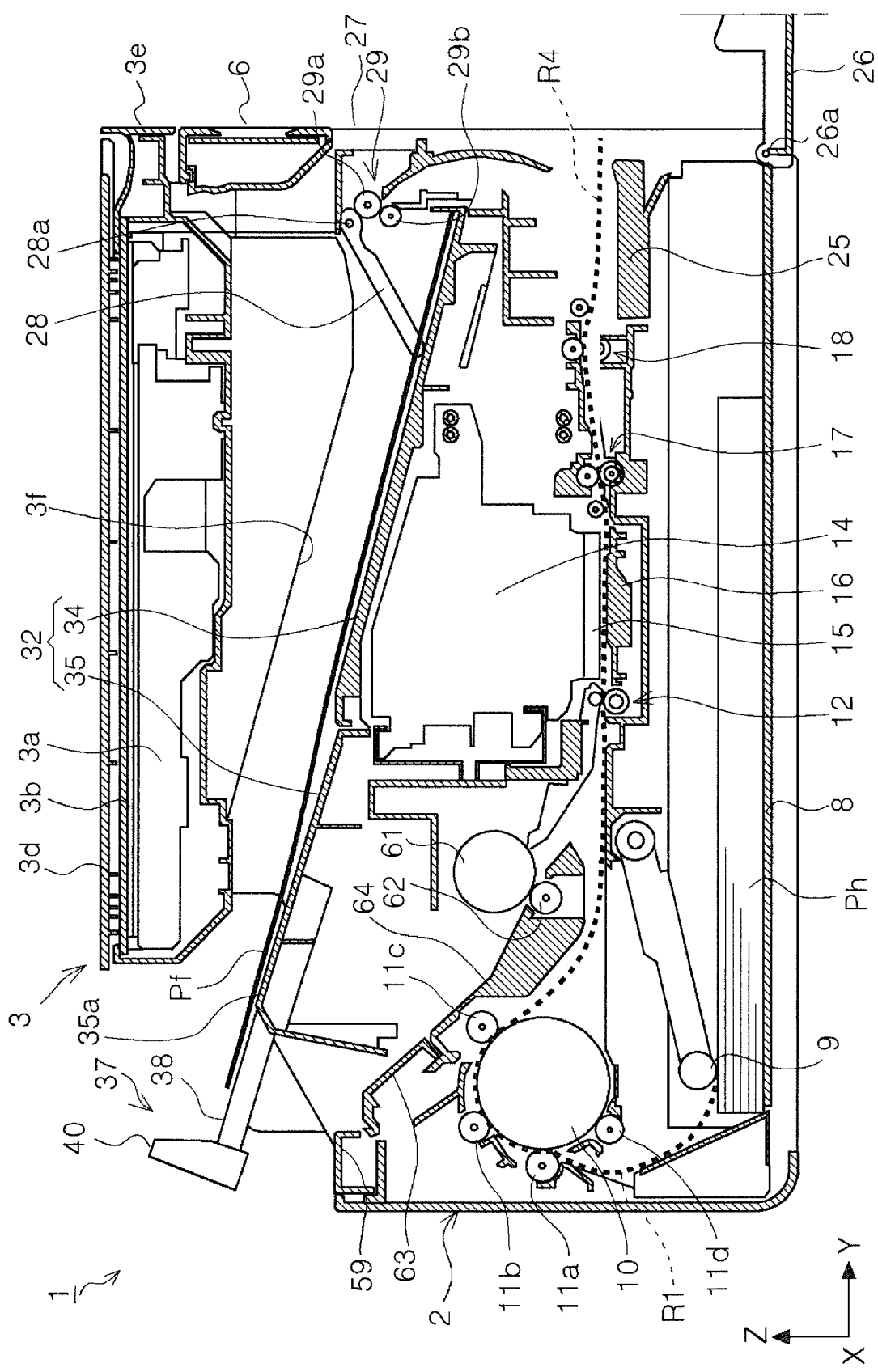
FIG. 8 is a side cross-sectional view illustrating sheet transport paths in a printer.
Figure 9:
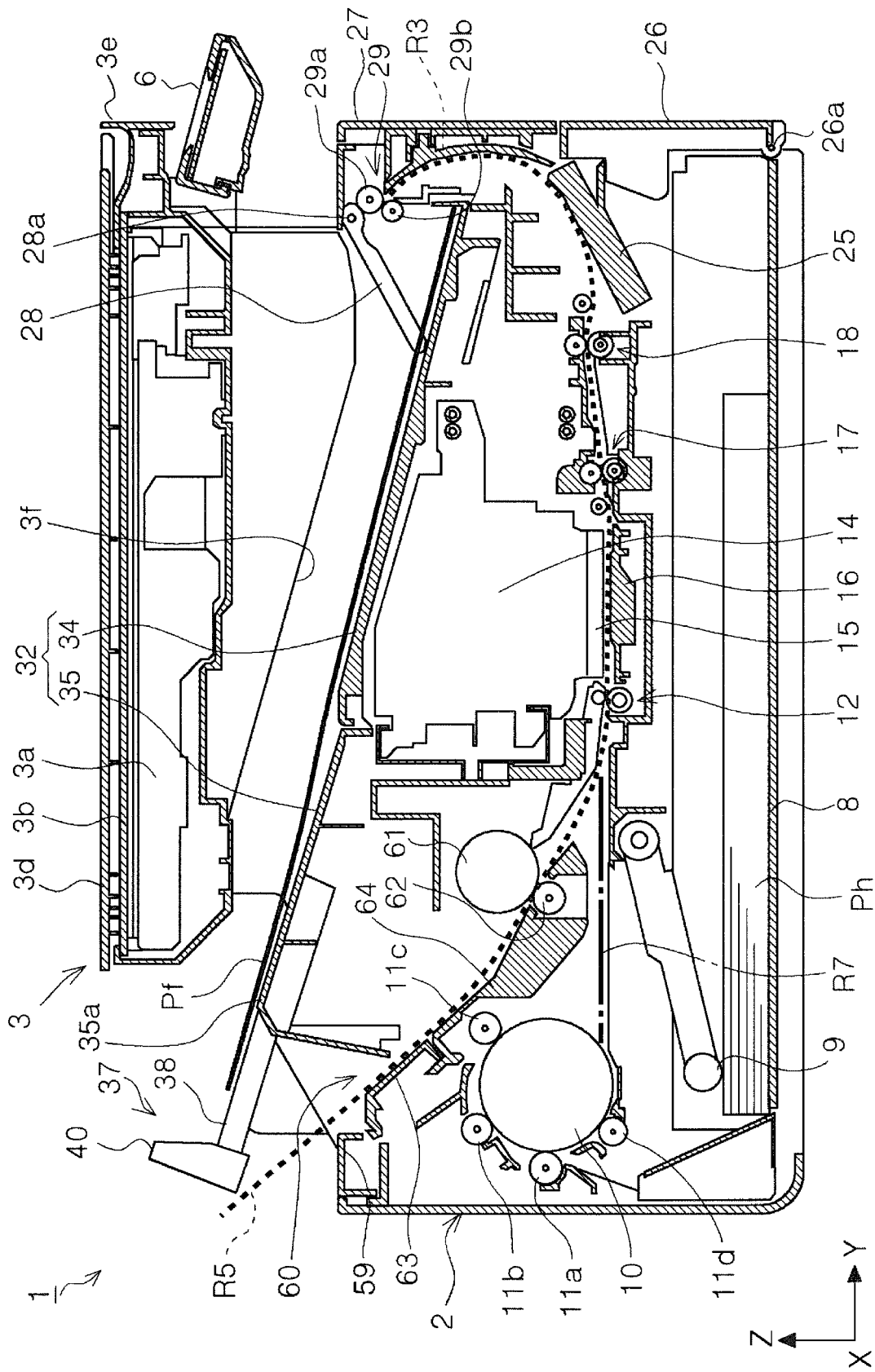
FIG. 9 is a side cross-sectional view illustrating sheet transport paths in a printer.

With reference to FIG. 7 to FIG. 11, paths for paper sheets in the printer 1 will be described. In FIG. 7 to FIG. 11, the paths for paper sheets are indicated by broken lines or alternate long and short dashed lines. Specifically, reference numeral R1 in FIG. 7 denotes a sheet feeding path. The sheet feeding path R1 according to the embodiment is a path from a sheet storage section 8 to a feeding roller pair 12. Reference numeral R3 denotes a first sheet discharge path. The first sheet discharge path R3 according to the embodiment is a path from a second intermediate roller pair 18 to a discharging roller pair 29. Reference numeral R5 in FIG. 9 denotes a sheet feeding path. The sheet feeding path R5 according to the embodiment is a path along which a sheet inserted from a feed port 60 on the apparatus rear side passes via a feeding roller 61 to the feeding roller pair 12. In FIG. 9, reference numeral R7 denotes a switchback path. The switchback path R7 is a path from the feeding roller pair 12 via a driven roller 11d to a driven roller 11a and is used to reverse a sheet for performing recording on both sides of the sheet.

Hereinafter, the paths will be further described in detail. A sheet storage section 8 that can store a plurality of sheets is disposed in a bottom section of the lower unit 2. The sheets stored in the sheet storage section 8 are fed downstream by a pickup roller 9 that is driven by a motor (not illustrated). FIG. 7 illustrates example sheets Ph that are stored in the sheet storage section 8. On the downstream side of the pickup roller 9, a reversing roller 10 that is driven by a motor (not illustrated) is disposed. The sheet fed from the sheet storage section 8 is curved and reversed by the reversing roller 10 and is sent toward the downstream feeding roller pair 12 that is driven by a motor (not illustrated).

Around the reversing roller 10, driven rollers 11a, 11b, 11c, and 11d are disposed, and the driven rollers press a sheet against the reversing roller 10. The driven rollers 11a, 11b, and 11c are disposed on the sheet feeding path R1, and the driven roller 11d is disposed on the switchback path R7 (FIG. 9).

On the downstream side of the feeding roller pair 12, a sheet supporting section 16 and a recording head 15 are disposed to face each other. The sheet supporting section 16 supports a sheet, and the recording head 15 serves as a recording section for discharging an ink, which is an example liquid, onto a sheet to perform recording. The recording head 15 is disposed on a carriage 14, and the carriage 14 is driven to reciprocate along the sheet width direction by a motor (not illustrated).

On the downstream side of the recording head 15, a first intermediate roller pair 17 is disposed, and on the downstream side of the first intermediate roller pair 17, the second intermediate roller pair 18 is disposed. A recorded sheet is sent downstream by the first intermediate roller pair 17 and the second intermediate roller pair 18.

On the downstream side of the second intermediate roller pair 18, the path-switching flap 25 is disposed. The path-switching flap 25 can swing about a pivot shaft (not illustrated). The path-switching flap 25 according to the embodiment swings in accordance with a user operation. The printer 1 can select one of two paths as a sheet discharge path. One of the paths is the first sheet discharge path R3 that serves as a face-down discharge path for discharging a recorded sheet with a most-recently recorded side placed face down, and the other one is the second sheet discharge path R4 (FIG. 8) that serves as a face-up discharge path for discharging a recorded sheet with a most-recently recorded side placed face up.

When the first sheet discharge path R3, which serves as the face-down discharge path, is used, the path switching flap 25 is held in an inclined orientation, which is a first state, as in FIG. 7. When the second sheet discharge path R4, which serves as the face-up discharge path, is used, the path switching flap 25 is held in a horizontal orientation, which is a second state, as in FIG. 8. The path switching flap 25 is held in an inclined orientation by a snap-fit mechanism (not illustrated) in this embodiment. The path switching flap 25 is held in the horizontal orientation by a support section (not illustrated) in this embodiment.

At an end position of the first sheet discharge path R3 for curving and reversing a sheet, the discharge roller pair 29 that serves as a sheet discharge section is disposed. The discharging roller pair 29 includes a discharge driving roller 29a that is driven to rotate by a motor (not illustrated) and a discharge driven roller 29b that is driven to rotate. A sheet discharged by the discharging roller pair 29 in a sheet discharging direction f is stacked on the sheet receiving section 32 that serves as a medium receiving section. An upper surface of the sheet receiving section 32 is used as a sheet receiving surface for receiving a discharged sheet.

The sheet receiving section 32 according to the embodiment includes, from the upstream side to the downstream side, a first discharge tray 34 and the second discharge tray 35. Upper surfaces of the first discharge tray 34 and the second discharge tray 35 constitute the sheet receiving surface. FIG. 7 illustrates an example sheet Pf that is being mounted. The first discharge tray 34 can be rotated about a rotating shaft (not illustrated) to be opened or closed, and when the first discharge tray 34 is open, the carriage 14 and around the carriage 14 are accessible.

On the downstream side of the sheet receiving section 32, a stopper 37 is disposed so as to control the position of a sheet leading edge when the leading edge of the discharged sheet comes into contact with the stopper 37. The stopper 37 prevents sheets from being discharged over the sheet receiving section 32. The stopper 37 includes a base section 38 and a protrusion 40, and the protrusion 40 is provided to the base section 38 by a torque hinge (not illustrated) so as to be able to rotate and hold a certain position. With this structure, the protrusion 40 may be in a protruding position (FIG. 4) in which the protrusion 40 protrudes from the sheet receiving section 32 or a retracted position (FIG. 5) in which the protrusion 40 less protrudes from the sheet receiving section 32 than in the protruding position. In this embodiment, the retracted position (FIG. 5) is substantially parallel to the base section 38. The base section 38 is in a position substantially parallel to the second discharge tray 35. With this structure, the protrusion 40 may be set in the retracted position to enable the user to remove sheets from the sheet receiving section 32 with less interference with the protrusion 40, and thus the convenience in removing sheets can be increased.

Returning to FIG. 7, pressing flaps 28 are disposed immediately downstream of the discharging roller pair 29. The pressing flaps 28 can swing about a pivot shaft 28a, and are disposed on both sides of a sheet in the sheet width direction. The pressure flaps 28 press a sheet being discharged from above to form a crest portion in the sheet along the sheet discharging direction, increasing the rigidity of the sheet in the sheet discharging direction, and thus the performance in aligning sheets on the sheet receiving section 32 can be increased. In other words, the pressing flaps 28 serve as a stiffness applying section for applying stiffness in the sheet discharging direction to a sheet being discharged.

In the above description, the printer 1 has been briefly described, and in the following description, a relationship among the lower unit 2, the upper unit 3, and the sheet receiving section 32 will be described. In this embodiment, the sheet receiving section 32, which is disposed in the lower unit 2 to receive a discharged sheet, is disposed to face a bottom surface 3f of the upper unit 3 as is clear from FIG. 7. A length B1 of the upper unit 3 is shorter than a length A1 of the lower unit 2 in the apparatus front-rear direction and the upper unit 3 is closer to the apparatus front with respect to the lower unit 2. Accordingly, an end portion 35a of the sheet receiving section 32 in the sheet discharging direction is exposed in the rear of the upper unit 3.

With this structure, in the apparatus front-rear direction, the upper unit 3 does not extend out over the lower unit 2 and thus reducing the size in the apparatus front-rear direction, and furthermore, as illustrated in FIG. 4, the end portion 35a of the sheet receiving section 32 in the sheet discharging direction is exposed in the rear of the upper unit 3 and the convenience in removing discharged sheets can be ensured.

The expression "the upper unit 3 is closer to the apparatus front with respect to the lower unit 2" specifically means that a central position (position Y2 in FIG. 7) of the upper unit 3 in the apparatus front-rear direction is closer to the apparatus front than a central position (position Y1 in FIG. 7) of the lower unit 2.

Figure 2:
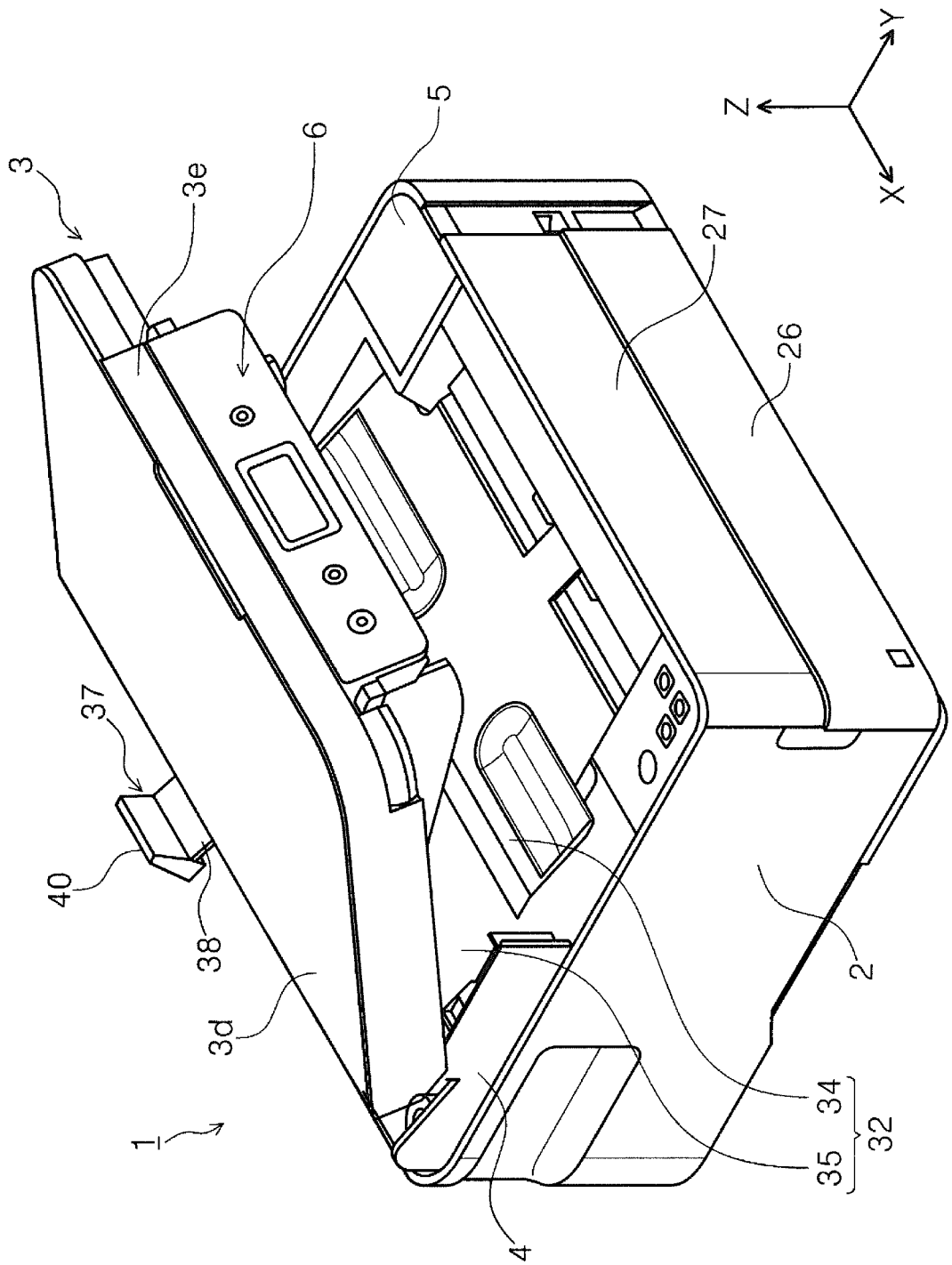
FIG. 2 is an external perspective view of a printer.

If the paper size is small and a discharged sheet is completely covered under the upper unit 3, the user can remove the discharged paper by opening the upper unit 3 with respect to the lower unit 2 to expose the sheet receiving section 32 as described with reference FIG. 2. From this state, the user may further open the second discharge tray 35 to access the carriage 14 and around the carriage 14.

In this embodiment, as is clear from FIG. 1 to FIG. 7, a side 3e of the upper unit 3 is flush with a side of the lower unit 2 on the apparatus front. On the apparatus front, the side of the lower unit 2 according to the embodiment includes the first cover 26 and the second cover 27. With this structure, as described above, the upper unit 3 does not extend out over the lower unit 2 in plan view and thus further reducing the size in the apparatus front-rear direction. In this embodiment, in addition to the side 3e of the upper unit 3 and the front of the lower unit 2, the front of the operation section 6 in a closed state is also flush with the sides.

Furthermore, in this embodiment, the operation section 6 for receiving an operation from a user is disposed between the lower unit 2 and the upper unit 3 in the vertical direction, and in the vertical direction, a portion of the operation section 6 overlaps with a portion of the second discharge tray 35 of the sheet receiving section 32. In this embodiment, the overlapping portions are in a range H2 in FIG. 7. With this structure, the vertical dimension of the apparatus can be reduced. In this embodiment, the length of the operation section 6 in the apparatus right-left direction is shorter than the lengths of the lower unit 2 and the upper unit 3, and the state of the sheet receiving section 32 is readily visually recognized from the apparatus front; however, the length of the operation section 6 may be the same as the lower unit 2 and the upper unit 3.

In this embodiment, the lower unit 2 includes the sheet feeding path R1 for curving and reversing a sheet fed from the sheet storage section 8 disposed below the recording head 15 and guiding the sheet toward the recording head 15, and a first sheet discharge path R3 for curving and reversing a recorded sheet with a most-recently recorded side placed face down and guiding the sheet toward the discharging roller pair 29, and the sheet feeding path R1 and the first sheet discharge path R3 have portions that overlap in the vertical direction. In this embodiment, the overlapping portions are in a range H1 in FIG. 7. With this structure, the vertical dimension of the apparatus can be reduced.

Figure 10:
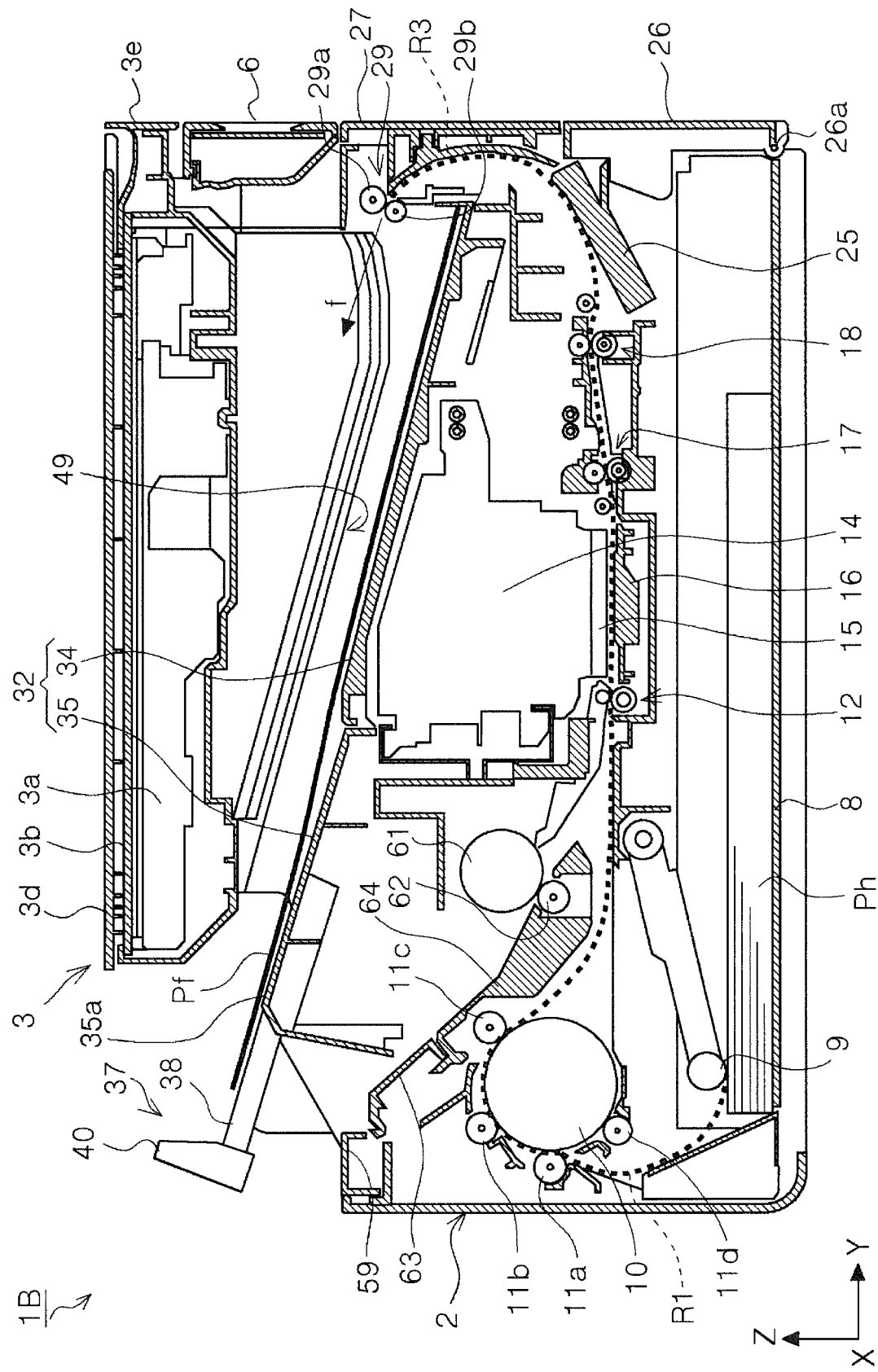
FIG. 10 is a side cross-sectional view illustrating sheet transport paths in a printer.
Figure 11:
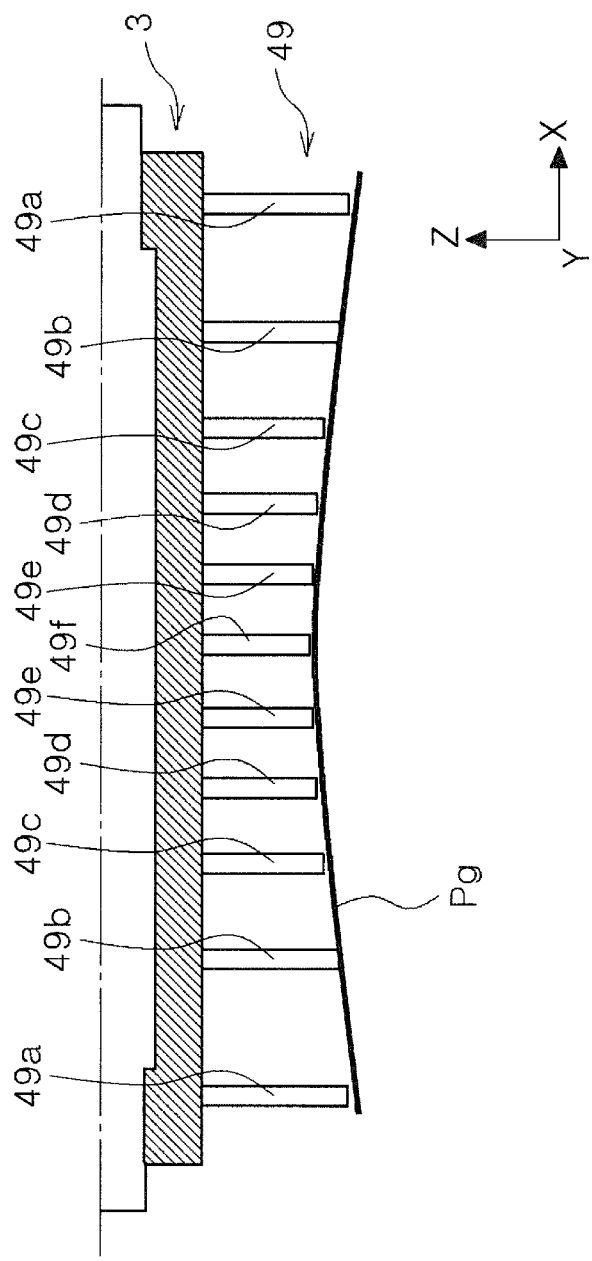
FIG. 11 is a front view of a rib in an upper unit.
Figure 12:
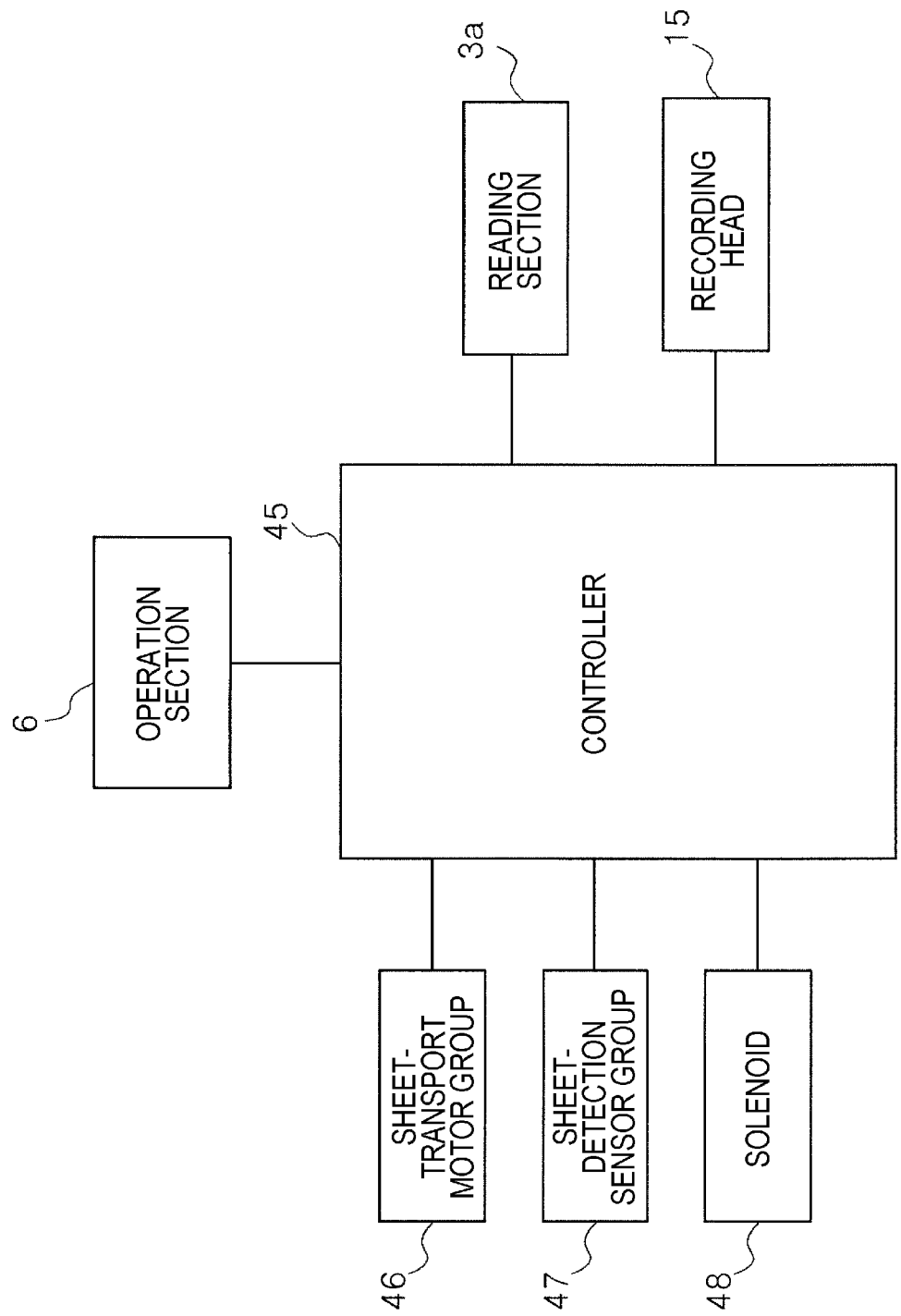
FIG. 12 is a block diagram illustrating a control system of a printer.

In the above-described embodiment, the stiffness applying section for applying stiffness to a sheet being discharged corresponds to the pressing flaps 28; however, the stiffness applying section may be a rib 49 as illustrated in FIG. 10 and FIG. 11. In FIG. 10, a printer 1B includes the rib 49. The rib 49 faces the sheet receiving section 32 in the upper unit 3 and extends in the sheet discharging direction. The rib 49 includes a plurality of ribs 49a, 49b, 49c, 49d, 49e, and 49f, which have different protruding amounts in the vertical direction, and disposed at appropriate intervals along the sheet width direction intersecting the sheet discharging direction. When viewed in the sheet discharging direction, as illustrated in FIG. 11, the rib 49 makes a sheet Pg in a convex shape.

In the sheet width direction, from the outermost rib 49a toward the central rib 49f, the amount of protrusion in the vertically downward direction decreases. The direction f toward which a sheet is discharged by the discharging roller pair 29 corresponds to a direction toward which the sheet is discharged and strikes the rib 49. With this structure, the sheet Pg discharged by the discharging roller pair 29 is pressed by the rib 49 to make the sheet in a convex shape as illustrated in FIG. 11, and thereby the stiffness is given in the sheet discharging direction. The convex shape is similar to the shape of the crest portion formed in a sheet by the pressing flaps 28 described with reference to FIG. 7. As described above, the rib 49 serves as the stiffness applying section, and thus the stiffness applying section can be provided in the simple structure at low cost. In this embodiment, although the curved shape formed in the sheet Pg is the convex shape, the curved shape may be a concave shape that is opposite to the convex shape. In such a case, contrary to the above-described embodiment, from the outermost rib 49a in the sheet width direction toward the central rib 49f, the amount of protrusion in the vertically downward direction increases.

Figure 5:
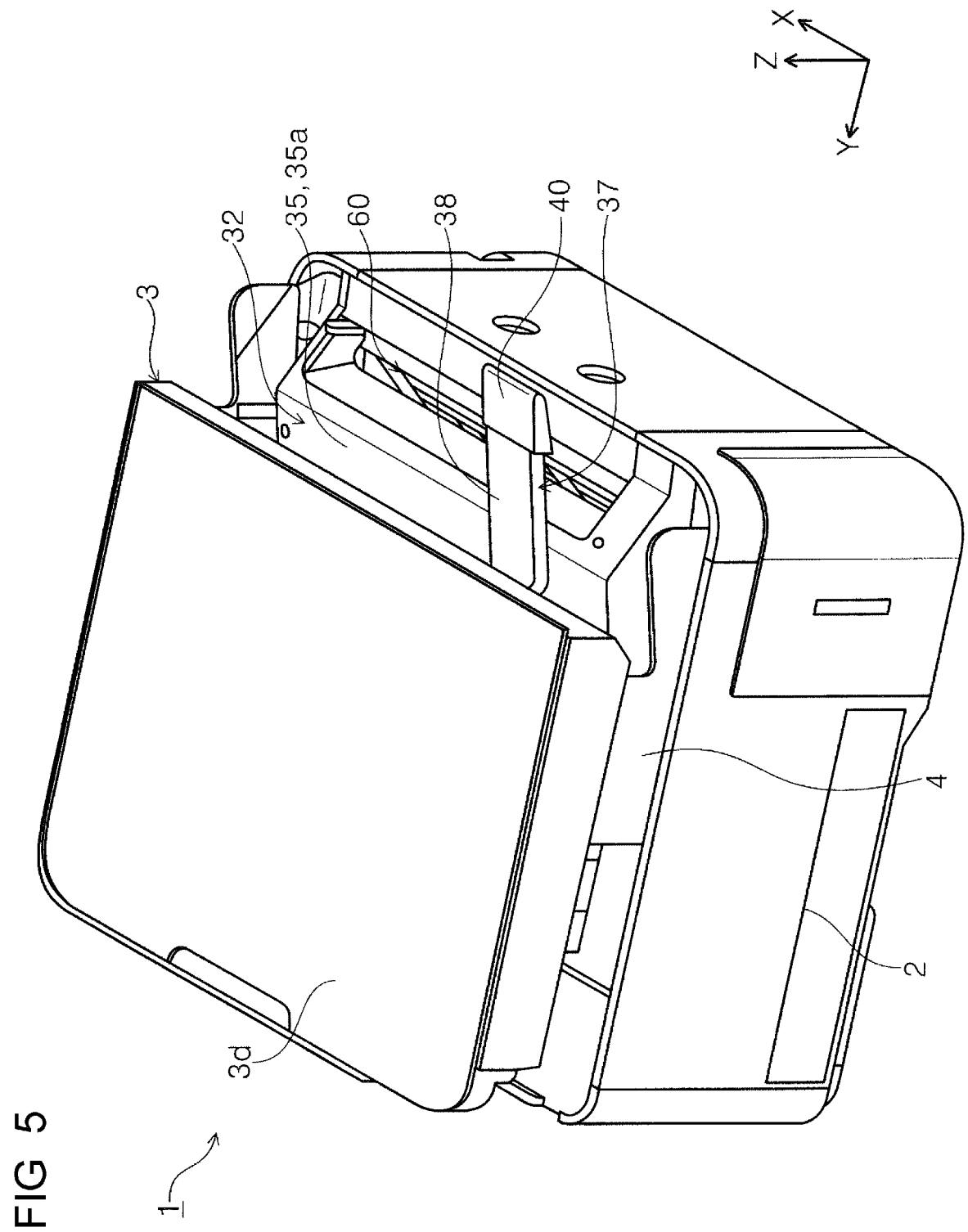
FIG. 5 is an external perspective view of a printer.
Figure 6:
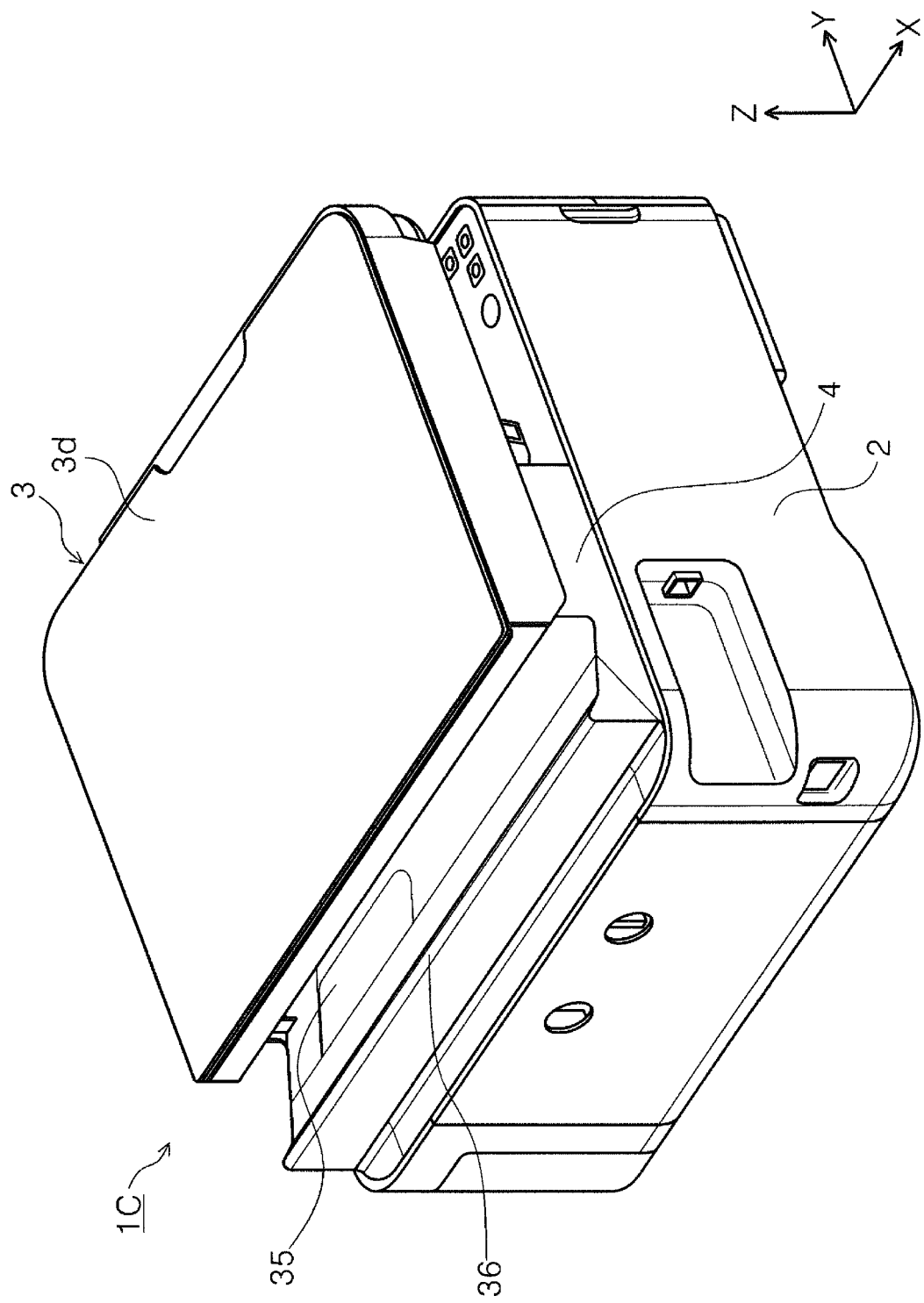
FIG. 6 is an external perspective view of a printer.

In the above-described embodiment, the feed port 60 is open on the rear side of the upper unit 3 as illustrated in FIG. 4 and FIG. 5. Alternatively, similarly to a printer 1C illustrated in FIG. 6, the feed port 60 may be omitted. With this structure, the performance in stacking discharged sheets can be increased. A convex portion 36 may be provided instead of the stopper 37 illustrated in FIG. 4 and FIG. 5. The convex portion 36 prevents sheets from being discharged over the sheet receiving section 32.

In the above-described embodiment, the path switching flap 25 for switching the first sheet discharge path R3, which serves as the face-down discharge path, and the second sheet discharge path R4, which serves as the face-up discharge path, is operated by a user; however, the path switching flap 25 may be automatically switched by using power of a solenoid, a motor or the like. FIG. 15 is a block diagram illustrating a control system of the printer 1 having such a structure. A controller 45 for performing various control processes controls the reading section 3a, the recording head 15, a sheet-transport motor group 46, and a solenoid 48 based on input information from the operation section 6 or a sheet-detection sensor group 47. The sheet-detection sensor group 47 is disposed on the sheet transport path and includes a plurality of sensors for detecting a passage of a leading edge or a trailing edge of a sheet. The sensors are disposed, for example in FIG. 7, near the upstream side of the first intermediate roller pair 17 or near the upstream side of the driven roller 11a. The sheet-transport motor group 46 includes a feeding motor (not illustrated) for driving the pickup roller 9 and the reversing roller 10, and a transporting motor (not illustrated) for driving the feeding roller pair 12, the first intermediate roller pair 17, the second intermediate roller pair 18, and the discharging roller pair 29. The solenoid 48 is a power source for switching the position of the path switching flap 25.

The structure for controlling the position of the path switching flap 25 by the controller 45 enables a selection of a sheet discharge path specified by a user, for example, via the operation section 6. The control system may have a control mode for automatically perform the sheet discharge path selection. In the control mode, when a sheet to be transported has a length that will be covered under the upper unit 3 when discharged onto the sheet receiving section 32, the controller 45 performs a predetermined process without feeding the sheet to the first sheet discharge path R3, which serves as the face-down discharge path.

Figure 13:
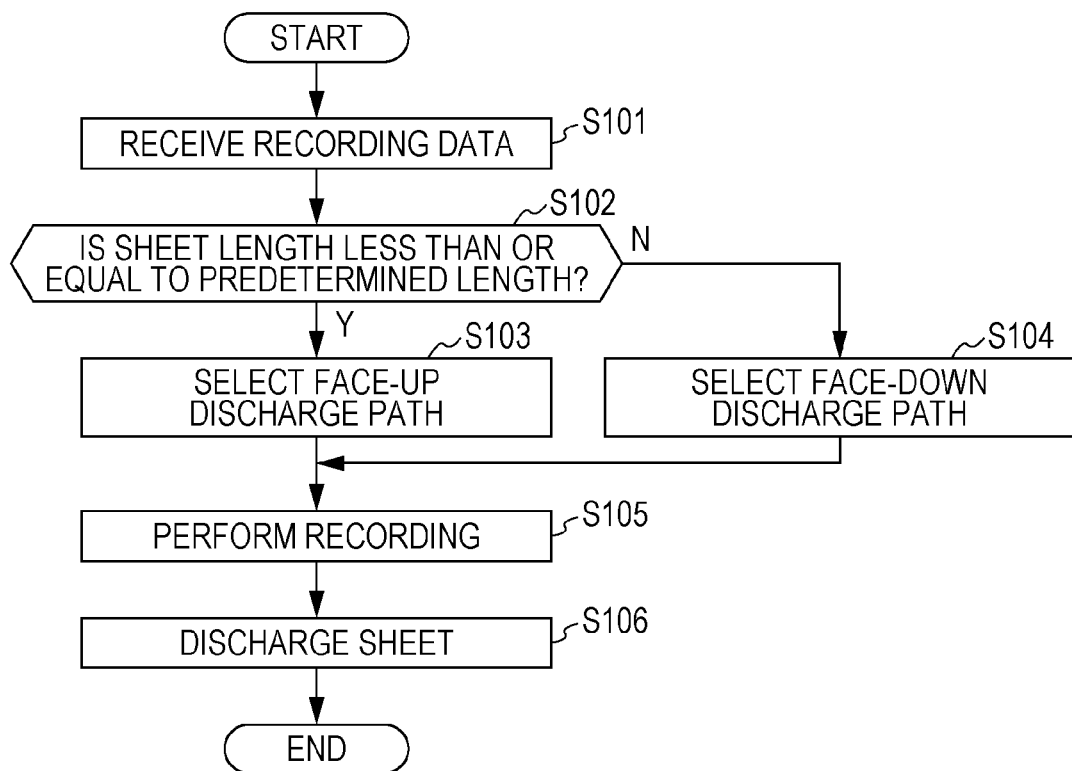
FIG. 13 is a flowchart illustrating control processing performed by a controller of a printer.

FIG. 13 illustrates such a predetermined process. When the controller 45 receives recording data (Step S101), the controller 45 determines based on sheet size information included in driver information whether the sheet length is less than or equal to a predetermined length (step S102). A sheet that has a length less than or equal to a predetermined length is a sheet, as described above, that will be covered under the upper unit 3 when discharged onto the sheet receiving section 32. When the sheet length is less than or equal to the predetermined length, the controller 45 sends the sheet to the second sheet discharge path R4, which serves as the face-up discharge path (step S103). In other cases, that is, when the sheet to be transported has a length that is longer than the lower side of the upper unit 3 when discharged onto the sheet receiving section 32, the controller 45 sends the sheet to the first sheet discharge path R3, which serves as the face-down discharge path (step S104). Then, the controller 45 performs recording to the sheet (step S105), and discharges the recorded sheet (step S106).

In the above-described example, the predetermined process to be performed when the sheet of a length that will be covered under the upper unit 3 when discharged onto the sheet receiving section 32 is the processes illustrated in steps S103 and S106. Specifically, the predetermined process includes, when the path switching flap 25 is in the first state (FIG. 7), the step of driving the solenoid 48 to switch the path switching flap 25 from the first state (FIG. 7) to a second state (FIG. 8), and the step of sending the sheet to the second sheet discharge path R4, which serves as the face-up discharge path.

As described above, when a sheet has a length that will be covered under the upper unit 3 when discharged onto the sheet receiving section 32, the predetermined process is performed without sending the sheet to the first sheet discharge path R3, which serves as the face-down discharge path. Accordingly, when a sheet to be transported is short and the upper unit 3 will interfere with the user in removing the sheet from the sheet receiving section 32, the discharge of the sheet to the sheet receiving section 32 is not performed to avoid the decrease in the convenience in removing the sheet. Furthermore, the sheet can be discharged via the appropriate path without a user operation, and thus the convenience of the user can be increased.

Note that when the sheet discharge path selection is not set to the automatic selection and the first sheet discharge path R3 is frequently selected by user operations, in order to perform recording to a sheet of a length less than or equal to a predetermined length, before the path switching flap 25 is switched from the first state (FIG. 7) to the second state (FIG. 8) to discharge the sheet, the controller 45 may display an alert and stop the recording operation to urge the user to determine whether to switch the discharge path or stop the recording operation.

In the above-described embodiment, the upper unit 3 extends along the X direction and is rotated about the torque hinge (not illustrated), that is, the rotation axis, provided on the rear of the apparatus to be opened toward the apparatus rear side. However, the upper unit 3 may extend along the X direction and may be rotated about a rotation axis provided on the front of the apparatus to be opened toward the apparatus front side. Alternatively, the upper unit 3 may extend along the Y direction and may be rotated about a rotation axis provided at a position closer to the right side of the apparatus to be opened toward the right side, or the upper unit 3 may extend along the Y direction and may be rotated about a rotation axis provided at a position closer to the left side of the apparatus to be opened toward the left side. Alternatively, the upper unit 3 may be slid toward the apparatus front side or the apparatus rear side, for example, by a linear guide to open the space above the sheet receiving section 32 or may be slid toward the apparatus right side or the left side to open the space above the sheet receiving section 32.

It is to be understood that the present disclosure is not limited to the above-described embodiments, various modifications can be made within the scope of the following claims, and these modifications are included within the scope of the disclosure.

What is claimed is:

1. A recording apparatus comprising:
a lower unit including a recording section configured to perform recording on a medium; and
an upper unit disposed on the lower unit, the upper unit including a document mounting plate on which a document is to be mounted, and a reading section configured to read an image of the document mounted on the document mounting plate, wherein
the lower unit includes a medium discharge section that reverses the medium recorded by the recording section and discharges the medium toward a rear of the apparatus, and
a medium receiving section disposed on an apparatus rear side with respect to the medium discharge section such that the medium receiving section faces a bottom surface of the upper unit, the medium receiving section being configured to receive the medium discharged by the medium discharge section, and
the upper unit is shorter than the lower unit in an apparatus front-rear direction and the upper unit is closer to an apparatus front with respect to the lower unit such that an end portion of the medium receiving section in a medium discharging direction is exposed at a rear of the upper unit.

2. The recording apparatus according to claim 1, wherein on the apparatus front, a side of the upper unit is flush with a side of the lower unit.

3. The recording apparatus according to claim 1, further comprising:
an operation section disposed, on the apparatus front, between the lower unit and the upper unit in the vertical direction, the operation section being configured to receive an operation from a user, wherein
a portion of the operation section and a portion of the medium receiving section overlap with each other in the vertical direction.

4. The recording apparatus according to claim 1, further comprising:
a stiffness applying section on the bottom surface of the upper unit, the stiffness applying section being configured to apply stiffness in the medium discharging direction to the medium discharged by the medium discharge section.

5. The recording apparatus according to claim 4, wherein the stiffness applying section comprises ribs that face the medium receiving section in the upper unit, extend in the medium discharging direction, and are disposed at appropriate intervals along a medium width direction intersecting the medium discharging direction, the ribs being configured, when viewed in the medium discharging direction, to make the medium in a convex shape or a concave shape.

6. The recording apparatus according to claim 1, further comprising:
a stopper disposed on a downstream side in the medium discharging direction in the medium receiving section such that a leading edge of the medium discharged from the medium discharge section comes into contact with, the stopper being configured to be in a protruding position in which the stopper protrudes from the medium receiving section or in a retracted position in which the stopper less protrudes from the medium receiving section than in the protruding position.

7. The recording apparatus according to claim 1, wherein the lower unit includes,
a first medium discharge path configured to curve and reverse the medium recorded by the recording section with a most-recently recorded side placed face down and guide the medium toward the medium discharge section,
a second medium discharge path configured to discharge the medium recorded by the recording section with a most-recently recorded side placed face up without curving and reversing the medium,
a path switching member configured to switch a path between a first state in which the first medium discharge path is formed and a second state in which the second medium discharge path is formed, and
a controller configured to control the apparatus, wherein
when the medium to be transported has a length that will be covered under the upper unit when the medium is discharged onto the medium receiving section, the controller performs a predetermined process without sending the medium to the first medium discharge path.

8. The recording apparatus according to claim 7, further comprising:
a driving section configured to drive the path switching member, wherein
the predetermined process includes, when the path switching member is in the first state, driving the driving section to switch the path switching member from the first state to the second state, and sending the medium to the second medium discharge path.

9. The recording apparatus according to claim 7, further comprising:
a medium feeding path configured to curve and reverse the medium fed from a medium storage section below the recording section and guide the medium toward the recording section, wherein
a portion of the medium feeding path and a portion of the first medium discharge path overlap with each other in the vertical direction.

* * * * *